United States Patent [19]

Svacik

[11] 3,914,444
[45] Oct. 21, 1975

[54] PREPARATION OF SLICED DRIED BEEF PRODUCT

[75] Inventor: Joseph T. Svacik, Chicago, Ill.

[73] Assignee: Armour and Company, Phoenix, Ariz.

[22] Filed: Mar. 29, 1973

[21] Appl. No.: 346,049

[52] U.S. Cl. ............... 426/284; 426/332; 426/382; 426/413; 426/418; 426/456
[51] Int. Cl.$^2$ ...................................... A22C 11/02
[58] Field of Search ........... 426/140, 277, 279, 284, 426/456, 465, 509, 520, 332, 382, 413, 418, 282; 53/132

[56] References Cited
UNITED STATES PATENTS

| | | | |
|---|---|---|---|
| 1,494,904 | 5/1924 | Hague | 426/509 |
| 2,430,818 | 11/1947 | Kellerman | 426/284 |
| 3,360,383 | 11/1967 | Rose et al. | 426/284 |
| 3,367,786 | 2/1968 | Rose | 426/284 |
| 3,413,129 | 11/1968 | Lieberman | 426/277 |
| 3,432,311 | 3/1969 | Gruner | 426/129 |
| 3,497,361 | 2/1970 | Wilcox | 426/284 |
| 3,622,353 | 11/1971 | Bradshaw | 426/284 |
| 3,658,561 | 4/1972 | Rose | 426/284 |

FOREIGN PATENTS OR APPLICATIONS

| | | | |
|---|---|---|---|
| 586,795 | 7/1944 | United Kingdom | 426/140 |

*Primary Examiner*—Samih N. Zaharna
*Assistant Examiner*—Ernest G. Therkorn
*Attorney, Agent, or Firm*—Frank T. Barber; Carl C. Batz

[57] ABSTRACT

A process for preparing sliced dried beef in which beef is ground into chunks which are mixed with a curing ingredient, stuffed into fibrous casings and cured. The casings containing cured meat are subjected to a drying procedure in which the casings are immersed in hot brine for a period of time during which moisture content is reduced. The meat having reduced moisture content is chilled, sliced and packaged.

9 Claims, No Drawings

PREPARATION OF SLICED DRIED BEEF PRODUCT

This invention relates to the preparation of a dried, cured meat product of the type sometimes referred to as sliced, dried beef or chipped beef.

BACKGROUND

The process which has customarily been employed in making this type of product requires a large packing facility and a relatively long period of time in processing. In addition, the quality of the product has left much to be desired. In general, the process as it has been carried out commercially during the past years starts with the cutting of beef hams into pieces and putting the pieces into a brine solution. The brine contains an amount of about 25 to 26 percent common salt which is near the saturation point of the solution. The brine solution may also contain nitrites as curing agents. The beef ham pieces are held in this solution for a period of about 40 or 50 days during which time the meat pieces pick up the cure and quantities of the salt. The temperature of the brine solution (sometimes called the "pickle") is maintained at a temperature of about 36° - 40°F. during this brine treatment. A warmer temperature would "break" the pickle and produce what is commonly called a "rusty" condition. At the end of the pickle treatment the meat is removed from the brine, washed and put into water to soak overnight which serves to remove some of the salt concentration at the surface of the meat. The meat pieces are then trimmed and hung in a heated area (140° – 150°F.) to dry for about 120 - 170 hours. Following this the meat is tempered at room temperature, then chilled, sliced and packaged. Usually the slices are packed together, folded and packed in glass jars. The product may contain salt in an amount of 10 – 12 percent, and moisture of the order of 50 percent.

Instead of soaking the relatively large pieces of beef in brine as above described it is known that the beef may be ground to form chunks of about 3 to 8 ounces and to mix and work the pieces along with salt and seasonings to bring out salt soluble proteins from the meat after which the mixture is stuffed into casings with the proteins serving along with the frayed edges of the pieces to bind the meat into a unitary body. Casings thus filled may be further treated by curing and drying in a heated chamber as above described. Such a process is set forth in U.S. Pat. No. 3,497,361.

It may be observed that in the processes above outlined long periods of curing and drying are involved. The long drying period requires the provision of heated rooms for holding the product over long periods of time, principally for the purpose of reducing the moisture content of the meat. In such a process the space requirements are substantial and the maintenance of elevated temperatures adds to the cost of processing.

SUMMARY

Accordingly, I have set myself to the task of discovering methods by which the necessary reduction in moisture of the meat can be accomplished in lesser periods of time or in ways which will not require the extensive drying facilities previously required.

Further, the product heretofore produced was subject to case hardening near the outer rim of the slice and we have sought methods which would eliminate such case hardening, thus providing a more uniform product of improved tenderness and quality.

I have discovered that the foregoing objects may be accomplished by introducing into the process of preparation a drying step in which the meat is held within a fibrous casing for a period of time in a brine solution maintained at elevated temperature during which period the moisture is reduced while maintaining the salt equilibrium of the meat. Our process is explained in greater detail in the course of the following Detailed Description in which one embodiment of my process is set forth.

DETAILED DESCRIPTION

Meat obtained from the hams of beef may be put through a grinder equipped with a two-hole grinding plate, to make pieces of irregular shape averaging preferably about 3 to 4 ounces in weight. The sizes of the meat pieces may be smaller or greater if desired. Normally I contemplate pieces averaging about 3 to 8 ounces in weight. These pieces may be put in a mixer, the salt and curing ingredients added, and the mixer operated for a few minutes to cause the salt to be thoroughly and uniformly distributed.

I prefer to add somewhat more salt than in the prior practice. The specific amount of common salt which is preferred to be used depends, for one thing, upon whether it is desired to produce a product which is more or less salty to taste. The amount of salt may vary, for example, from about 3 to 11 percent. If 7.75 percent salt was found according to prior practices to be about right for producing a sufficiently salty and stable product, then I would prefer in my process to use about 9.0 percent salt, or an increase of from about 1 to 3 percent. A typical meat mixture for use according to my invention might be given in the following Table I. As given in this table the meat including moisture contained therein is taken as 100 percent, and the salt and other ingredients are listed as percentages based on the meat.

TABLE I

|  | Percent |
| --- | --- |
| Meat | 100 |
| Common salt | 9.0 |
| Sodium erythorbate | 0.55 |
| Sodium nitrite | 0.0148 |

The meat mixture with salt and curing ingredients added may be stuffed into fibrous casings. Such casings may be cylindrical in shape having a diameter of, for example, about 4 or 5 inches, and made of cellulose fibers. Cloth casings may be used, if desired, it being required only that the casings be strong enough to retain their shape and to pass moisture from the meat into the brine solution as the brine treatment proceeds.

After stuffing, the casings are then left to cure in the cooler at about 36° to 40°F. for a period to develop the cure, suitably about 3 or 4 days. A longer cure can be given, but without particular advantage.

Following the curing period the filled casings may be put into a steam jacketed kettle and immersed in a brine solution having a salt concentration of from 8 to 26 percent. The brine solution with the filled casings immersed therein is heated to about 170° to 210°F., preferably about 175° to 190°F., and held at this elevated temperature for a period to dry the meat. The drying period while heated and immersed in brine solution may be from about 8 hours to about 16 hours.

At the end of the brine drying period the filled casings are removed from the brine solution, showered for a few minutes with water of about 130° to 160°F. and hung for a period of 8 or more hours in a heated room (about 140° to 145°F.) to produce an additional decrease in moisture. Following this the stuffed casings may be tempered at ambient temperature conditions for a period, suitably about 60 to 72 hours, and then chilled, sliced and packaged.

The meat filled casings when subjected to the drying steps above described may be reduced in weight by at least 20 percent during the brine drying procedure, by a further amount of at least 5 percent during the holding period in the warmed atmosphere, and then by a still further amount of about 5 percent or more in the tempering step at ambient temperatures, which may amount to a total shrink of about 30 to 50 percent. The desirable amount of shrink may vary, but from 35 to 45 percent is generally considered desirable, but somewhat more or less may be satisfactory.

By an alternate procedure which has some advantages the stuffed casings are not hung in a heated area following the drying procedure as above described, but instead are passed directly to the tempering step where they may be held at ambient temperatures for a period of about 72 to 120 hours, after which they may be chilled, sliced and packaged. This alternate procedure eliminates entirely the need for holding the meat in a heated facility for drying purposes. Though the period for holding the meat at ambient temperature is somewhat longer than in my process first described, this process may be preferable where facilities for holding at elevated temperatures are not readily available.

In this alternate procedure the reduction in weight during the final holding period at ambient or room temperatures may be from about 7 to 14 percent or more, and may bring the total shrink by this procedure well within the limits desired.

In addition to the advantages of a shorter processing time, my processes have been found to produce an improved product in that the case hardening at the edges of the slice is eliminated or at least diminished, leaving a more uniform texture and a product which generally is more tender. Further, the color of the product is somewhat lighter than previously experienced causing the product to look more attractive.

To further illustrate the practice of my invention I give the following specific examples:

EXAMPLE I

Beef hams were boned and trimmed and ground through a grinder with a two-hole grinding plate to yield meat pieces averaging about 3 to 4 ounces in weight. 8.2 pounds of this meat was placed in a mixer along with a curing mixture in the proportion of 8.3 pounds per 100 pounds of meat, the curing mixture containing common salt sodium erythorbate and sodium nitrite in the percentage proportion of 7.6:0.55:0.0148, these percentages being based on the weight of the meat. The meat and curing mixture was mixed until a creamy exudate appears on the outer surfaces of the pieces of meat. Then 8.4 pounds of this meat mixture was stuffed into a No. 6½ fibrous casing (4¼ to 4½ inches in diameter) and the filled casing held for curing in a cooler at a temperature between 36° and 40°F. for 3½ days, after which the cured casing was placed in a jacketed kettle containing 10 percent of sodium chloride heated to 180°F. After heating in the brine solution for 8 hours the casing was removed from the brine, showered, skivered and placed in a heated house (about 140° to 145°F.) for 16 hours after which the product was put in storage in the cooler and later sliced. Tests showed a shrink of 17.7 percent in the brine solution and 5.4 percent in the warm house, with a total shrink of 38.7 percent from the weight of the cured casing. The filled casing weighed 8.2 pounds after curing and after the drying treatments weighed 5.25 pounds. Total drying time involved was 88 hours. The diameter of the casing when sliced was 3.3–5/16 inches. The product had a good color, texture and aroma.

EXAMPLE II

The same procedure was used as set forth in Example I, except that the time in the brine solution was increased to 16 hours and the time in the warm room was decreased to 8 hours. This resulted in a shrink of 23.2 percent in the brine step and a shrink of 5.3 percent in the warm room step, and an overall shrink from the stuffed weight of 39.3 percent.

EXAMPLE III

The same procedure was used as set forth in Example II except that the meat mixture was stuffed into a size 7½ casing (diameter of 4.68 inches to 4.75 inches). There was a 20 percent shrink during the processing in the brine solution and a 5.65 percent shrink in the warmed room resulting in a total shrink of 34.6 percent. The diameter of the casing when sliced was 3⅞ inches.

EXAMPLE IV

The same procedure was used as set forth in Example I except that the brine treatment was continued for 12 hours and the treatment in the warm room was 12 hours. This resulted in a shrink in the brine solution of 20 percent and in the warm room of 5.45 percent, and a total overall shrink of 37.5 percent.

EXAMPLE V

The same procedure was used as set forth in Example III except that 9.9 pounds of meat was used in the test and the mixed meat included curing ingredients in the proportion, based on the weight of the meat, of 9 percent sodium chloride, 0.55 percent sodium erythorbate and 0.0148 percent sodium nitrite. The hot brine solution in which the filled casing was treated contained 15 percent sodium chloride. There was a 19 percent shrink in weight during the hot brine treatment and a 9.5 percent shrink during the treatment in the warm room. The casing was further dried for 96 hours at ambient temperature to shrink it another 9 percent resulting in a total shrink of 38.1 percent in the drying steps and a drying time of 120 hours.

EXAMPLE VI

The same procedure was used as set forth in Example V except that the hot brine employed contained 20 percent sodium chloride. The shrink was 23.3 percent in the hot brine treatment and 7.2 percent in the warm room drying step and 15.2 percent in the 120 hour drying step at ambient temperature, resulting in a total shrink in the drying steps of 41.0 percent.

EXAMPLE VII

The same procedure was used as set forth in Example VI except the drying step in the warm (140°F.) room was omitted altogether and the ambient temperature drying step was continued for 104 hours resulting in a shrink during the drying steps of 41.6 percent.

EXAMPLE VIII

As a control, 25 pounds of the meat mixture containing curing ingredients as described in Example V was stuffed into casings size No. 8-U, and subjected to the curing step as described in Example I. The cured, filled casings were held in a warm room for 6 days to obtain a shrink of 35 percent and then held at ambient temperature for 48 hours to obtain a total shrink from the cured weight of 40 percent with a total time of 230 hours.

While in the foregoing detailed description I have described only a few embodiments of the invention, it is understood that the process may embody many and various specific practices, and that many changes may be made without departing from the spirit of the invention and being contained within the scope of the appended claims.

I claim:

1. In a process for preparing a dried beef product which includes the steps of stuffing pieces of beef along with common salt as a seasoning agent and sodium nitrite as a curing agent into a preformed fibrous casing and holding the stuffed casing in a cool atmosphere at a temperature of about 36° to 40°F for a period of time sufficient to develop a cure by said sodium nitrite, the improvement which includes the steps of drying the cured meat following said period by immersing the cured meat while contained in said casing in a solution of common salt having a concentration of from 8 to 26 percent and holding said cured meat while so immersed at a temperature of about 170° to 210°F. for a period of time sufficient to remove a substantial amount of moisture from said meat.

2. A process as set forth in claim 1 in which said last-mentioned period is from 8 to 24 hours.

3. A process as set forth in claim 2 in which said last-mentioned period is at least 16 hours.

4. A process as set forth in claim 1 in which said first-mentioned period is at least three days.

5. A process as set forth in claim 1 in which said last-mentioned temperature is from 175° to 190°F.

6. A process as set forth in claim 1 in which said last-mentioned holding period is continued until the weight of said meat has been reduced by at least 20 percent.

7. A process as set forth in claim 1 in which said drying procedure is followed by the step of holding said casings containing meat in an atmosphere having a temperature of from 135° to 150°F to further reduce the moisture of said meat by an additional amount.

8. A process as set forth in claim 7 including the step of subjecting said casing containing meat to a tempering step following said last-mentioned holding step, said tempering step being at ambient temperature and extending for a period of from 60 to 72 hours.

9. A process as set forth in claim 1 including the step of subjecting casing filled with meat and following said drying procedure to a holding step in which said casing containing meat is held at ambient temperature for a period of from 72 to 120 hours during which period the moisture content is further reduced.

* * * * *